April 22, 1958 J. W. CHALFANT 2,831,976

TRANSMITTER FOR REMOTE MODEL CONTROL

Filed July 20, 1956

INVENTOR.
John W. Chalfant
BY Henry H. Snelling
Attorney.

United States Patent Office 2,831,976 Patented Apr. 22, 1958

2,831,976

TRANSMITTER FOR REMOTE MODEL CONTROL

John W. Chalfant, Wilmington, Del.

Application July 20, 1956, Serial No. 599,097

5 Claims. (Cl. 250—36)

Figure 1:
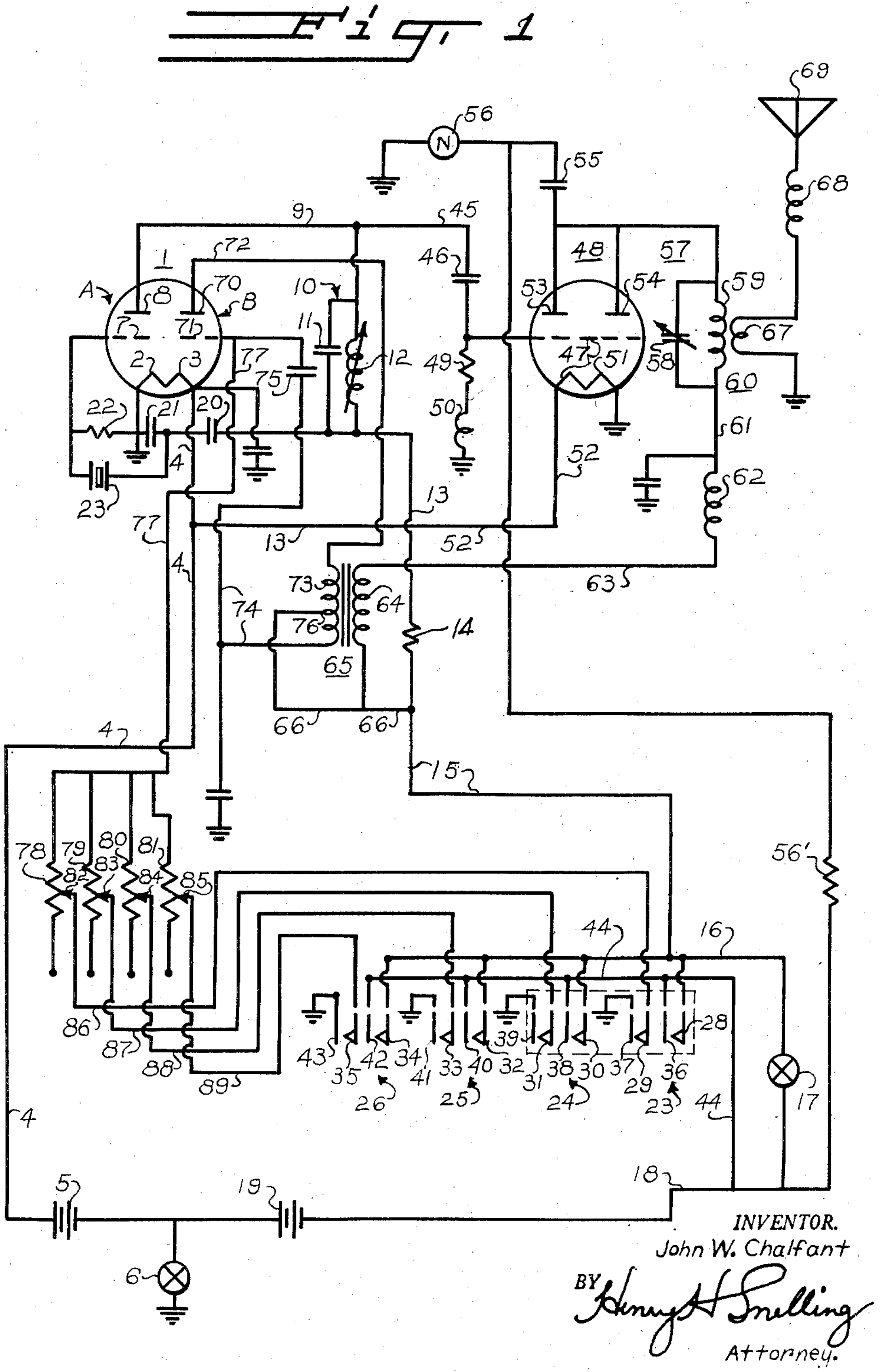

The present invention relates generally to transmitters of electromagnetic wave energy and in particular to light weight and portable radio transmitters capable of generating carrier waves selectively modulated by any one of a plurality of control frequencies.

It is an object of the present invention to provide a battery energized radio transmitter employing electron tubes, wherein the transmitter is maintained in a standby condition with the tube filaments energized and wherein battery drain is minimized by supplying plate voltage to the tubes only during intervals when information is to be transmitted.

It is another object of the present invention to provide a portable radio transmitter utilizing a plurality of circuit components which perform dual functions in the transmitter, thereby to minimize the complexity of the equipment.

Yet another object of the present invention is to provide a radio transmitter employing a visual indicator comprising a gaseous discharge device for indicating whether the transmitter is in a standby condition, is generating a carrier signal of desired intensity or in generating a modulated carrier signal having a predetermined percent modulation, preferably 100%.

Still another object of the present invention is to provide a radio transmitter having provision for selective maintenance in a standby or in a carrier generating condition, the transmitter including a gaseous discharge device which selectively develops discharge of two distinct colors in response to energizing voltages of D. C. and A. C., respectively, and circuits for selectively applying to the discharge device D. C. and A. C. energizing voltages according as the transmitter is in the standby condition or is generating a carrier of at least a predetermined energy content.

It is still another object of the present invention to provide a portable transmitter capable of generating a carrier signal selectively modulated with any one of a plurality of predetermined control tones, which is particularly economical of fabrication and free of maintenance difficulties.

It is another object of the present invention to provide a portable lightweight radio transmitter capable of selectively generating one of a plurality of control tones for remotely controlling a signal receiver disposed on a model boat, plane or similar device.

It is another object of the present invention to provide a radio transmitter having provisions for selective maintenance in a standby condition or in an unmodulated carrier generating condition, the transmitter including a gaseous discharge device which selectively develops a discharge of a first color in response to a D. C. voltage of a proper magnitude, a discharge of a second color and a first intensity in response to an A. C. voltage of a first magnitude and a discharge of the second color and of a greater intensity in response to an A. C. voltage of a greater magnitude than the first magnitude and circuits for selectively applying to the discharge device a D. C. voltage of the proper magnitude while the transmitter is in the standby condition, an A. C. voltage superposed on the D. C. voltage which A. C. voltage is of the first magnitude when the transmitter is generating a carrier of at least a predetermined energy content and an A. C. voltage of the second magnitude when the transmitter is generating a modulated carrier having a predetermined percent modulation; the A. C. voltage of the first and second magnitudes being developed by superposing a portion of the carrier and modulated carrier signals, respectively, on the gaseous discharge device.

Yet another object of the present invention is to provide a radio transmitter including a variable frequency modulation oscillator having a regenerative feedback circuit, phase shift of feedback voltage in the feedback circuit determining the oscillatory frequency of the oscillator, switching circuits being provided for selectively coupling any one of a plurality of different impedances in the feedback circuit to determine selectively the phase shift of the feedback voltage.

Yet another object of the present invention is to provide a radio transmitter including a modulation oscillator having a regenerative frequency determining circuit including provision for introducing into the regenerative circuit any one of a plurality of different frequencies.

The above and still further objects, features and advantages of the present invention will become apparent upon consideration of the following detailed description of one specific embodiment thereof, especially when taken in conjunction with the accompanying drawings, wherein:

The single figure is a schematic wiring diagram of a transmitter in accordance with the present invention.

Referring now more specifically to the single figure of the accompanying drawing, a dual triode 1 having sections A and B is provided with series connected filamentary cathodes 2 and 3, one end of the series connected cathodes 2 and 3 being connected to a point of reference potential, i. e., ground, and the other end being connected over a lead 4 to one terminal of a suitable source of filament voltage, conventionally illustrated as a battery 5, the other terminal of the source 5 being connected to ground through a single-pole single-throw switch 6. The tube 1A further includes a control grid 7 and a plate 8, the plate 8 being connected via a lead 9, a parallel resonant circuit 10 comprising capacitor 11 and inductor 12 in parallel, a lead 13, a resistor 14, a lead 15, a lead 16, a normally open, single-pole, single-throw switch 17 and a lead 18, to the positive terminal of a source of plate voltage conventionally illustrated as a battery 19. The negative terminal of the battery 19 is connected to ground through the switch 6. The lead 13 is further connected through series connected capacitors 20 and 21 to ground. The grid 7 of the tube 1A is connected to ground through a resistor 22 and is further connected to the junction of the capacitors 21 and 22 through a piezo-crystal 23. The tube 1A and its associated circuit elements comprise a conventional oscillator having a parallel resonant circuit 10 in its plate circuit and a frequency stabilizing crystal 23 in its grid circuit. In the present invention the tube section 1A, employed as the carrier oscillator, is normally inactive in consequence of the fact that plate voltage is disconnected from the plate 8 by the normally open switch 17. Plate voltage may be applied to tube section 1A, to render it active, by closing the switch 17 or closing any one of a plurality of additional normally open switches 23, 24, 25 and 26. Each of the switches 23–26, inclusive, includes two stationary contacts, 28 and 29, 30 and 31, 32 and 33 and 34 and 35, respectively, and two movable contacts 36 and 37, 38 and 39, 40 and 41 and 42 and 43, respectively. The stationary contacts 28, 30, 32 and 34 are connected in parallel to the lead 16 and their associated movable contacts 36, 38, 40 and 42 are connected in parallel to a lead 44 and over lead 44 to the lead 18. Consequently, the carrier oscillator comprising the tube section 1A and its associated circuits may be activated by closing the switch 17, or any one of the switches 23–26, inclusive, to apply plate voltage to the plate 8 of the tube 1A.

The output voltage of the tube 1A is applied over a lead 45 and through a capacitor 46 to a grid 47 of a dual triode 48 having its two sections connected in parallel, the grid 47 being returned to ground through series connected resistor 49 and inductor 50. The tube 48 employs series connected filamentary cathodes 51 connected between ground and lead 52, which is connected via lead 4 to the source of heater voltage 5. Plates 53 and 54 of the tube 48 are connected in parallel and are coupled to ground through series connected capacitor 55 and a neon bulb 56 which constitute a voltage divider for developing a predetermined portion of the signals at the plates 53 and 54 across the neon bulb 56. The junction of the capacitor 55 and neon bulb 56 is connected via a dropping resistor 56′ to the lead 18. The plates 53 and 54 receive plate voltage via a series circuit including a tunable parallel-resonant circuit 57 consisting of a variable capacitor 58 and a primary winding 59 of an output transformer 60, a lead 61, an R. F. choke 62, a lead 63, a secondary winding 64 of a transformer 65, a lead 66 and over the lead 15 to the switches 17 and 23–26. In consequence of return of this series circuit to the lead 15, plate voltage may be applied to the tube 48 by closing any one of the switches 17 or 23–26. The transformer 60 has a secondary winding 67 having one terminal connected to ground and the other terminal connected to a series circuit having a loading coil 68 and an antenna 69. The tube 48 operates as a combined power amplifier and mixer, the carrier oscillations applied to the grid 47 being amplified by the tube 48 and being modulated by modulating voltages applied to the plates 53 and 54 in consequence of modulating signals developed in the secondary winding 64 of the transformer 65, as will hereinafter be explained. The dropping resistor 56′ serves two functions in the circuit. The resistor 56′ drops the voltage of the plate supply source to the value of the ionization potential of the bulb 56 and it limits the current flow through the bulb to prevent damage thereto and to minimize drain on the plate supply batteries.

The section B of the tube 1 is employed as a generator of audio frequencies which are employed by the tube 48 to modulate the carrier signals. The section B of the tube 1 includes a plate 70 and a grid 71, the plate 70 being coupled via a lead 72, a primary winding 73 of the transformer 65, a lead 74 and a capacitor 75 to its associated grid 71. The primary winding 73 is provided with a center tap 76, connected over the lead 66 to the lead 15. The grid 71 is further connected over a lead 77 to four adjustable resistors 78, 79, 80 and 81, connected in parallel. The resistors 78–81 are provided with sliders 82, 83, 84 and 85, respectively, which slidably engage the respective resistors, and serve to adjust the values thereof. The sliders 82–85 are individually connected over leads 86, 87, 88 and 89, respectively, to the stationary contacts 29, 31, 33 and 35, respectively, of the switches 23 through 26. The movable contacts 37, 39, 41 and 43 associated with stationary contacts 29, 31, 33 and 35, respectively, are connected in parallel to ground. The modulation oscillator comprising tube 1B and its associated circuits is a phase-shift oscillator employing plate-to-grid feedback, the frequency of oscillation being determined by the degree of phase shift of the voltage feedback from the plate 70 to the grid 71. The feedback voltage is induced in the lower section of the secondary winding 73 of transformer 65 disposed between the center tap 76 and the lead 74 in consequence of the signals flowing in the upper section of the winding 73 disposed between the plate 70 of tube 1B and the lead 15. The voltages induced in the lower section of winding 73 are 180° out of phase with the voltages in the upper section and the variation from this initial 180° shift is determined by the amount of resistance connected from grid 71 to ground with the capacitor 75 between the lead 74 and ground. The amount of this resistance is determined by the settings of the sliders 82–85 on the respective resistors 78–81, each of sliders 82–85 being set to provide a different value of resistance from grid 71 to ground with the capacitor 75. The degree of phase shift of the feedback voltage and consequently the frequency of oscillation of the tube 1B is determined by selection of one of switches 23–26. The modulating signals generated by the tube 1B and its associated circuits are developed in the primary winding 73 of the transformer 65 and are induced by transformer action in the secondary winding 64, connected in series between the source of plate voltage 19 and the plates 53 and 54 of the tube 48. Consequently, the modulating signals appear on the plates 53 and 54 and modulate the carrier signals applied to the grid 47.

Proceeding now to a description of the operation of the transmitter hereinabove specifically described in detail, the switch 6 is closed to complete the energizing circuits for the filamentary cathodes 2, 3 and 51. The tubes 1 and 48 remain inactive, since the plate voltage circuits of the tubes 1 and 48 are open at the switch 17, or at switches 23–26. Upon closing of the switch 6 the negative terminal of the plate voltage source 19 is grounded and a circuit is completed through the neon bulb 56. When only the voltage from the source 19 is applied to the neon bulb 56 the color of its discharge is red indicating that the switch 6 is closed and consequently that filament voltage is applied to the filaments of tubes 1 and 48 and that the transmitter is ready for operation, i. e., is in a standby condition. Initially it is desired to adjust the gain of the tube 48 to at least a predetermined level. This is accomplished by closing the switch 17, which applies plate voltage to the tubes 1 and 48. The carrier oscillator, tube 1A, and the tube 48 become active but the modulation oscillation, tube 1B, remains quiescent since its grid circuit is maintained open by now open switches 23–26, inclusive. Carrier frequency signals developed on lead 45 are applied through capacitor 46 to the grid 47 of the output tube 48, a portion of the carrier signal developed at the plates 53 and 54 being coupled through the capacitor 55 to the neon bulb 56. The neon bulb 56 is of a type that changes the color of its discharge in accordance with the magnitude and frequency of the applied voltage. For example, the dropping resistor 56′ is chosen such that the discharge of the bulb 56 is red when the plate voltage supply is applied thereto. Upon the energization of the tubes 1A and 48, a portion of the carrier voltage is superposed on the D. C. voltage applied by source 19 and if the power output of the tube 48 is at the desired level, the color of the discharge of bulb 56 changes from red to blue. An example of a neon bulb which may be employed is tube type NE–51 manufactured by General Electric Company, which develops a red discharge when energized by 65 volts D. C. and which develops a blue-purple discharge when subjected to a predetermined voltage at a predetermined frequency. The frequency of the A. C. signal and the magnitude of the voltage which must be applied to the neon bulb 56 to produce a blue-purple discharge are interrelated. For example, if the carrier oscillator produces a voltage having a frequency of 27 m.c./s. the magnitude of the voltage must be approximately 65 volts to produce a blue-purple discharge. If the level of the carrier signal is below the desired level, the color of the discharge of the bulb 56 does not change when plate voltage is applied to the oscillator, indicating that the parallel resonant circuit 57 is not properly tuned to the carrier frequency. The capacitor 58 is then varied until the discharge assumes a blue-purple color, indicating that the circuit 57 is tuned to the carrier frequency and therefore that the power output of the tube 48 is at the proper level. Accordingly, the neon bulb serves to indicate that the switch 6 is closed, i. e., that the transmitter is in a "standby" condition, and also that the power output of the tube 48 is at the proper level.

The neon bulb further serves to indicate the percent modulation of the carrier by the modulating signals. After the circuit 57 has been properly tuned the switch 17 is opened and the tubes 1 and 48 again become quiescent. When it is desired to transmit a modulated carrier signal one of switches 23 through 26 is closed, the particular switch closed being determined by the desired frequency of the modulating signal. It is well known that the magnitude of the voltage peaks of a modulated carrier are greater than the magnitude of the voltage peaks of the unmodulated carrier, being twice as great with 100 modulation. Consequently, when the carrier signal is modulated by closing one of the switches 23 through 26, the magnitude of the voltage applied to the neon bulb 56 is increased, increasing the brilliancy of the glow by an amount dependant upon the percent modulation of the carrier signal. Therefore by observing the change in brilliancy of the neon bulb 56 upon modulation of the carrier signal, an indication is obtained of the percent modulation of the carrier signal, a maximum change in brilliancy being observed when 100% modulation subsists.

As a specific example of one preferred mode of utilization of a transmitter arranged in accordance with the present invention, it maybe employed for remotely controlling a model boat having receiving and control apparatus capable of responding to the various transmitted modulating signals to effect distinct maneuvers of the boat. Thus, the modulating frequencies generated when the various switches 23 through 26 are closed may produce specific predetermined maneuvers, such as, left turn, right turn, stop and go. Upon the closing of one of the switches 23–26, inclusive, for example, the switch 23, the contact 36 engages the contact 28 and closes the plate voltage circuits of the tubes 1 and 48, while the contact 37 engages the contact 29 to complete the circuit of the grid 71 of the tube 1B. The value of the resistance of resistor 78, included in the circuit of grid 71, determines the frequency of the modulating voltage, which may be adjusted by varying the position of the slider 82 on the resistor 78. Closing of the remaining switches 24, 25 and 26 likewise effects the generation of distinct modulating signals for control purposes.

The transmitter of the present invention provides a small, compact and efficient apparatus. Drain on the plate voltage source 19 is minimized since it must supply power to the circuits only during transmitting intervals. The modulation frequency selection circuits are uncomplicated and require only one switch and one resistor for each frequency. The number of components required and consequently the complexity of the circuitry is minimized by having the transformer 65 and the tube 48, each serve a dual function, the transformer 65 providing phase reversal of the feed-back signal due to the auto-transformation of signals in the lower section of its primary winding 73, and also coupling the modulating signal to the plates 53 and 54 of the tube 48 through its secondary winding 64. The tube 48 serves as both a power amplifier for the carrier signals and a modulator for modulating the carrier signals with the audio signals developed by tube 1B. The neon bulb 56 is employed to indicate that the transmitter is in a standby condition, that the circuit 57 is tuned to the carrier frequency and to give an approximation of the percent modulation of the carrier signal. The utilization of a minimum number of components in the circuit permits the fabrication of a unit that is of lightweight and consequently may readily be made portable.

The number of modulating frequencies that may be generated is determined by the number of resistors, such as resistors 78–81, connected in the circuit of grid 71. This number may, accordingly, be increased without modifying the design of the circuit. Although only four resistors 78 through 81 associated switches 23–26, are illustrated and described in the preferred embodiment of the invention, either more or fewer such resistors and switches may be employed within the scope of the present invention, depending upon the number of control functions it is desired to perform. Further, although the phase shift of the feedback voltage, and therefore the modulating frequency, is illustrated as being determined by resistive elements, other types of impedance elements such as capacitors, inductances and variable reactance tubes may be employed. The particular forms and types of oscillator circuits employed are examplary and various other well-known types of oscillator circuits may be utilized within the scope of the present invention. Further, although the tubes 1 and 48 are illustrated as employing filamentary cathodes, it is within the scope of the present invention to employ tubes employing indirectly heated cathodes.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What is claimed is.

1. In combination a first audio frequency oscillator and a second radio frequency oscillator, a first and a second electron tube included in said first and second oscillators, respectively, a third electron tube, each of said electron tubes having an anode, a control electrode, a cathode and a cathode heating circuit, the electron tube included in said first oscillator having a normally open control electrode circuit, a first switch means adapted to connect said anodes of all of said electron tubes to a source of anode voltage and to close said normally open control electrode circuit, second switch means adapted only to connect said anodes of all of said electron tubes to a source of anode voltage, third switch means adapted to energize said cathode heating circuits, and means for applying the oscillatory voltages generated by said first and second oscillators to said anode and said control electrode of said third electron tube, respectively.

2. The combination in accordance with claim 1, comprising further means for rendering said first and second switch means ineffective to connect said anodes of a source of anode voltage when said cathode heating circuits are de-energized by said third switch means.

3. The combination in accordance with claim 1, wherein said first oscillator includes an anode-to-control electrode feedback circuit, transformer means connected in said feedback circuit and including first winding means for reversing the phase of the signals applied to said control electrode with respect to the signals generated at said anode, and second winding means for coupling the oscillatory voltages generated by said first oscillator to said anode of said third tube means.

4. The combination in accordance with claim 1, wherein said first oscillator includes an anode-to-control electrode feedback circuit, and phase shift means for shifting the phase of the feedback voltage to determine the frequency of oscillation of said first oscillator, said phase shift means including a plurality of impedance means, each impedance means being adapted to shift the phase of the feedback voltage by different predetermined degrees upon being connected in said feedback circuit, said first switch means selectively connecting said impedance means in said feedback circuit.

5. The combination in accordance with claim 1 further comprising a glow discharge device adapted to develop discharges of two distinct colors in response to D. C. and A. C. energizing voltages respectively of proper magnitudes, said third switch means being adapted to apply a D. C. voltage of said proper magnitude to said discharge device, means for controlling the gain of said third electron tube and said second switch means superposing a predetermined portion of the amplified signal developed by said third tube on said D. C. voltage to develop a voltage of the other proper magnitude when the gain of said third electron tube is at a desired value.

References Cited in the file of this patent

UNITED STATES PATENTS

| | | |
|---|---|---|
| 2,110,082 | Granger | Mar. 1, 1938 |
| 2,138,894 | Ware | Dec. 6, 1938 |
| 2,312,810 | Finch | Mar. 2, 1943 |
| 2,479,964 | Pinkerton | Aug. 23, 1949 |
| 2,601,416 | Idzerda | June 24, 1952 |